US008639782B2

(12) United States Patent
Liu et al.

(10) Patent No.: US 8,639,782 B2
(45) Date of Patent: Jan. 28, 2014

(54) METHOD AND SYSTEM FOR SHARING METADATA BETWEEN INTERFACES

(75) Inventors: Allen Yihren Liu, San Francisco, CA (US); Philip J. King, San Mateo, CA (US); Ajay K. Agrawal, Cupertino, CA (US)

(73) Assignee: eBay, Inc., San Jose, CA (US)

( * ) Notice: Subject to any disclaimer, the term of this patent is extended or adjusted under 35 U.S.C. 154(b) by 683 days.

(21) Appl. No.: 11/508,420

(22) Filed: Aug. 23, 2006

(65) Prior Publication Data
US 2008/0052367 A1 Feb. 28, 2008

(51) Int. Cl.
*G06F 15/177* (2006.01)
(52) U.S. Cl.
USPC ........................................................ 709/220
(58) Field of Classification Search
USPC .......................................................... 709/220
See application file for complete search history.

(56) References Cited

U.S. PATENT DOCUMENTS

| | | | |
|---|---|---|---|
| 5,063,523 A | 11/1991 | Vrenjak | |
| 5,535,403 A | 7/1996 | Li et al. | |
| 5,696,909 A | 12/1997 | Wallner | |
| 5,835,911 A | 11/1998 | Nakagawa et al. | |
| 5,846,265 A | 12/1998 | McGregor et al. | |
| 5,870,722 A | 2/1999 | Albert et al. | |
| 5,920,725 A * | 7/1999 | Ma et al. | 717/171 |
| 5,923,885 A * | 7/1999 | Johnson et al. | 717/176 |
| 6,085,169 A | 7/2000 | Walker et al. | |
| 6,092,035 A | 7/2000 | Kurachi et al. | |
| 6,134,533 A | 10/2000 | Shell | |
| 6,141,653 A | 10/2000 | Conklin et al. | |
| 6,151,589 A | 11/2000 | Aggarwal et al. | |
| 6,167,567 A * | 12/2000 | Chiles et al. | 717/173 |
| 6,226,412 B1 | 5/2001 | Schwab | |
| 6,336,105 B1 | 1/2002 | Conklin et al. | |
| 6,415,270 B1 | 7/2002 | Rackson et al. | |
| 6,567,821 B1 | 5/2003 | Polk | |
| 6,623,529 B1 | 9/2003 | Lakritz | |
| 6,665,676 B2 | 12/2003 | Twig et al. | |
| 6,771,291 B1 | 8/2004 | DiStefano | |
| 7,007,026 B2 | 2/2006 | Wilkinson et al. | |
| 7,076,453 B2 | 7/2006 | Jammes et al. | |
| 7,133,835 B1 | 11/2006 | Fusz et al. | |
| 7,165,041 B1 | 1/2007 | Guheen et al. | |
| 7,191,393 B1 | 3/2007 | Chin et al. | |
| 7,234,110 B2 | 6/2007 | Sumitomo | |
| 7,315,826 B1 | 1/2008 | Guheen et al. | |

(Continued)

FOREIGN PATENT DOCUMENTS

JP 2000-322490 11/2000
JP 04-094643 3/2004

OTHER PUBLICATIONS

"Hello direct store joins eBay network of merchants", *PR Newswire*, New York, NY, (May 23, 2002), 1.
"International Search Report PCT/US00/32088", PCT/US00/32088.

(Continued)

*Primary Examiner* — William Goodchild
(74) *Attorney, Agent, or Firm* — Schwegman, Lundberg & Woessner, P.A.

(57) ABSTRACT

A system communicates a client application and a web application and receives configuration data operable within the web application and the client application. The system distributes the configuration data to the client application and the web application. The distributed configuration data is then used to configure the client application and the web application.

20 Claims, 9 Drawing Sheets

(56) References Cited

U.S. PATENT DOCUMENTS

| | | | |
|---|---|---|---|
| 7,337,133 | B1 | 2/2008 | Bezos et al. |
| 7,340,389 | B2 | 3/2008 | Vargas |
| 7,941,348 | B2 | 5/2011 | Veres et al. |
| 8,078,505 | B2 | 12/2011 | Veres et al. |
| 8,255,286 | B2 | 8/2012 | Veres et al. |
| 8,442,871 | B2 | 5/2013 | Veres et al. |
| 2001/0027472 | A1* | 10/2001 | Guan .......................... 709/203 |
| 2001/0039531 | A1 | 11/2001 | Aoki |
| 2001/0049707 | A1 | 12/2001 | Tran |
| 2002/0029182 | A1 | 3/2002 | Nakagawa |
| 2002/0042835 | A1 | 4/2002 | Pepin et al. |
| 2002/0046137 | A1 | 4/2002 | Odom et al. |
| 2002/0073111 | A1 | 6/2002 | Heyliger |
| 2002/0082953 | A1 | 6/2002 | Batham et al. |
| 2002/0082977 | A1 | 6/2002 | Hammond et al. |
| 2002/0099562 | A1 | 7/2002 | Bruce et al. |
| 2002/0116318 | A1 | 8/2002 | Thomas et al. |
| 2002/0123959 | A1 | 9/2002 | Mozley et al. |
| 2002/0147784 | A1* | 10/2002 | Gold et al. ................... 709/208 |
| 2002/0184610 | A1 | 12/2002 | Chong et al. |
| 2003/0005159 | A1 | 1/2003 | Kumhyr |
| 2003/0055747 | A1 | 3/2003 | Carr et al. |
| 2003/0083952 | A1 | 5/2003 | Simpson et al. |
| 2003/0110047 | A1 | 6/2003 | Santosuosso |
| 2003/0115484 | A1* | 6/2003 | Moriconi et al. ............. 713/201 |
| 2003/0139975 | A1 | 7/2003 | Perkowski |
| 2003/0154134 | A1 | 8/2003 | Wang |
| 2003/0167213 | A1 | 9/2003 | Jammes et al. |
| 2003/0229554 | A1 | 12/2003 | Veres et al. |
| 2005/0102151 | A1 | 5/2005 | Fuwa et al. |
| 2006/0074792 | A1 | 4/2006 | Wagoner et al. |
| 2007/0016893 | A1* | 1/2007 | Branda et al. ................. 717/127 |
| 2007/0112643 | A1 | 5/2007 | Veres et al. |
| 2011/0231530 | A1 | 9/2011 | Veres et al. |
| 2012/0047029 | A1 | 2/2012 | Veres et al. |
| 2012/0246233 | A1 | 9/2012 | Veres et al. |

OTHER PUBLICATIONS

"International Search Report PCT/US01/02584", PCT/US01/02584.
"International Search Report PCT/US01/04811", PCT/US01/04811.
"International Search Report PCT/US01/23854", PCT/US01/23854.
"International Search Report PCT/US02/04692", PCT/US02/04692.
"International Search Report PCT/US99/18510", PCT/US99/18510.
"International Search Report PCT/US99/29312", PCT/US99/29312.
"Mediappraise Receives National Award for Web-based Technology That Enables Companies to Solve Thorny HR Problem", *Business Wire Press Release*, (Dec. 15, 1998), 1-2.
"Yahoo! Auctions Celebrates One-Year Anniversary; As Online Auction Usage Continues to Grow, Yahoo! Is Quickly Becoming the World Marketplace of the New Millennium", *Business Wire*, (Sep. 14, 1999), 3 pages.
Akin, David , "Web retailing gains market muscle as concerns fade: Record season: Increasing number of sites catering for Canadian dollars", *Financial Post*, p04, (Dec. 26, 1998), 3 pages.
Business Wire, "Subasta.com, the Premier Online Auction Board for Latin America, Spain, and the Hispanic Sector of the U.S., Has Attracted Over 60,000 Viewers in Less Than Two Months!", *Business Wire*, (Jul. 16, 1999), 2 pages.
Grubbs, L. , "Top 5 auction utilities",*PC World.com*, San Francisco, CA, (Dec. 4, 2000), 1.
M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", *M2 Presswire*, (Mar. 22, 2000), 2 pages.
Merrill, Kevin , "GE Capital to extend integrator buying spree. (GE Capital Technology", *Computer Reseller News*, n691, (Jul. 8, 1996), 2(1).
www.AuctionWatch.com, recovered from www.archive.org on Jun. 8, 2007, (Aug. 15, 2000), 30 pages.
www.thinclient.net., Accessed via www.archive.org on Feb. 26, 2008, (Jun. 22, 2004), 24 pgs.
"U.S. Appl. No. 09/602,110, Advisory Action mailed May 26, 2006", 3 pgs.
"U.S. Appl. No. 09/602,110, Appeal Brief filed Dec. 15, 2006", 34 pgs.
"U.S. Appl. No. 09/602,110, Appeal Decision mailed Feb. 28, 2008", 13 pgs.
"U.S. Appl. No. 09/602,110, Decision on Pre-Appeal Brief mailed Aug. 15, 2006", 2 pgs.
"U.S. Appl. No. 09/602,110, Final Office Action mailed Mar. 8, 2006", 11 pgs.
"U.S. Appl. No. 09/602,110, Final Office Action mailed Sep. 2, 2004", 13 pgs.
"U.S. Appl. No. 09/602,110, Final Office Action mailed Nov. 17, 2008", 12 pgs.
"U.S. Appl. No. 09/602,110, Final Office Action mailed Nov. 21, 2005", 11 pgs.
"U.S. Appl. No. 09/602,110, Non Final Office Action mailed Jan. 21, 2004", 13 pgs.
"U.S. Appl. No. 09/602,110, Non Final Office Action mailed Apr. 5, 2005", 11 pgs.
"U.S. Appl. No. 09/602,110, Non-Final Office Action mailed Mar. 18, 2009", 19 pgs.
"U.S. Appl. No. 09/602,110, Non-Final Office Action mailed Jul. 21, 2008", 12 pgs.
"U.S. Appl. No. 09/602,110, Pre-Appeal Brief filed Jun. 27, 2006", 4 pgs.
"U.S. Appl. No. 09/602,110, Reply Brief mailed May 15, 2007", 2 pgs.
"U.S. Appl. No. 09/602,110, Response filed Jan. 3, 2005 to Final Office Action mailed Sep. 2, 2004", 16 pgs.
"U.S. Appl. No. 09/602,110, Response filed Jan. 23, 2006 to Final Office Action mailed Nov. 21, 2005", 15 pgs.
"U.S. Appl. No. 09/602,110, Response filed Feb. 17, 2009 to Final Office Action mailed Nov. 17, 2008", 21 pgs.
"U.S. Appl. No. 09/602,110, Response filed May 8, 2006 to Final Office Action mailed Mar. 8, 2006", 17 pgs.
"U.S. Appl. No. 09/602,110, Response filed May 21, 2004 to Non-Final Office Action mailed Jan. 21, 2004", 18 pgs.
"U.S. Appl. No. 09/602,110, Response filed Aug. 4, 2005 to Non Final Office Action mailed Apr. 5, 2005", 19 pgs.
"U.S. Appl. No. 09/602,110, Response filed Oct. 21, 2008 to Non-Final Office Action mailed Jul. 21, 2008", 19 pgs.
"U.S. Appl. No. 09/602,110, Response to Examiner's Answer filed May 7, 2007", 11 pgs.
"U.S. Appl. No. 10/252,126, Appeal Brief filed Feb. 4, 2009", 22 pgs.
"U.S. Appl. No. 10/252,126, Final Office Action mailed Feb. 26, 2008", 12 pgs.
"U.S. Appl. No. 10/252,126, Final Office Action mailed Jun. 27, 2006", 11 pgs.
"U.S. Appl. No. 10/252,126, Final Office Action mailed Sep. 4, 2008", 13 pgs.
"U.S. Appl. No. 10/252,126, Non Final Office Action mailed Jan. 30, 2007", 9 pgs.
"U.S. Appl. No. 10/252,126, Non Final Office Action mailed Feb. 3, 2006", 8 pgs.
"U.S. Appl. No. 10/252,126, Non Final Office Action mailed Aug. 20, 2007", 8 pgs.
"U.S. Appl. No. 10/252,126, Response filed May 3, 2006 to Non Final Office Action mailed Feb. 3, 2006", 7 pgs.
"U.S. Appl. No. 10/252,126, Response filed Jun. 25, 2007 to Non Final Office Action mailed Jan. 30, 2007", 11 pgs.
"U.S. Appl. No. 10/252,126, Response filed Jul. 28, 2008 to Final Office Action mailed Feb. 26, 2008", 7 pgs.
"U.S. Appl. No. 10/252,126, Response filed Oct. 27, 2006 to Final Office Action mailed Jun. 27, 2006", 8 pgs.
"U.S. Appl. No. 10/252,126, Response filed Dec. 20, 2007 to Non-Final Office Action mailed Aug. 20, 2007", 8 pgs.
"U.S. Appl. No. 10/252,126, Response filed Dec. 29, 2005 to Restriction Requirement mailed Oct. 31, 2005", 5 pgs.
"U.S. Appl. No. 10/252,126, Restriction Requirement mailed Oct. 31, 2005", 7 pgs.

(56) References Cited

OTHER PUBLICATIONS

"U.S. Appl. No. 10/252,127, Advisory Action mailed Jan. 10, 2007", 3 pgs.

"U.S. Appl. No. 10/252,127, Advisory Action mailed Dec. 12, 2008", 3 pgs.

"U.S. Appl. No. 10/252,127, Decision on Pre-Appeal Brief mailed Feb. 11, 2009", 2 pgs.

"U.S. Appl. No. 10/252,127, Decision on Pre-Appeal Brief mailed May 12, 2008", 3 pgs.

"U.S. Appl. No. 10/252,127, Final Office Action mailed Jan. 11, 2007", 11 pgs.

"U.S. Appl. No. 10/252,127, Final Office Action mailed Sep. 4, 2008", 12 pgs.

"U.S. Appl. No. 10/252,127, Final Office Action mailed Oct. 6, 2006", 10 pgs.

"U.S. Appl. No. 10/252,127, Non Final Office Action mailed Mar. 21, 2006", 9 pgs.

"U.S. Appl. No. 10/252,127, Non Final Office Action mailed Jul. 11, 2007", 9 pgs.

"U.S. Appl. No. 10/252,127, Pre-Appeal Brief Request filed Jan. 5, 2009", 5 pgs.

"U.S. Appl. No. 10/252,127, Pre-Appeal Brief Request mailed Apr. 10, 2008", 5 pgs.

"U.S. Appl. No. 10/252,127, Response filed Mar. 27, 2008 to Final Office Action mailed Jan. 11, 2008", 16 pgs.

"U.S. Appl. No. 10/252,127, Response filed Jun. 21, 2006 to Non Final Office Action mailed Mar. 21, 2006", 8 pgs.

"U.S. Appl. No. 10/252,127, Response filed Oct. 11, 2007 to Non-Final Office Action mailed Jul. 11, 2007", 15 pgs.

"U.S. Appl. No. 10/252,127, Response filed Nov. 4, 2008 to Final Office Action mailed Sep. 4, 2008", 22 pgs.

"U.S. Appl. No. 10/252,127, Response filed Dec. 6, 2006 to Final Office Action mailed Oct. 6, 2006", 14 pgs.

"U.S. Appl. No. 10/252,128, Final Office Action mailed Apr. 3, 2009", 27 pgs.

"U.S. Appl. No. 10/252,128, Non-Final Office Action mailed Mar. 21, 2008", 12 pgs.

"U.S. Appl. No. 10/252,128, Response filed Jul. 21, 2008 to Non-Final Office Action mailed Mar. 21, 2008", 11 pgs.

"U.S. Appl. No. 10/252,128, Response filed Dec. 23 ,2008 to Restriction Requirement mailed Nov. 24, 2008", 10 pgs.

"U.S. Appl. No. 10/252,128, Restriction Requirement mailed Nov. 24, 2008", 8 pgs.

"U.S. Appl. No. 10/252,129, Advisory Action mailed Nov. 26, 2008", 3 pgs.

"U.S. Appl. No. 10/252,129, Final Office Action mailed Oct. 5, 2007", 10 pgs.

"U.S. Appl. No. 10/252,129, Non Final Office Action mailed May 15, 2007", 10 pgs.

"U.S. Appl. No. 10/252,129, Response filed Aug. 13, 2007 to Non-Final Office Action mailed May 15, 2007", 16 pgs.

"U.S. Appl. No. 10/252,129, Advisory Action mailed Mar. 13, 2007", 3 pgs.

"U.S. Appl. No. 10/252,129, Final Office Action mailed May 29, 2008", 9 pgs.

"U.S. Appl. No. 10/252,129, Final Office Action mailed Sep. 15, 2008", 11 pgs.

"U.S. Appl. No. 10/252,129, Final Office Action mailed Dec. 27, 2006", 12 pgs.

"U.S. Appl. No. 10/252,129, Non Final Office Action mailed Aug. 18, 2006", 10 pgs.

"U.S. Appl. No. 10/252,129, Non-Final Office Action mailed Jan. 14, 2008", 10 pgs.

"U.S. Appl. No. 10/252,129, Non-Final Office Action mailed Feb. 10, 2009", 11 pgs.

"U.S. Appl. No. 10/252,129, Response filed Feb. 22, 2007 to Final Office Action mailed Dec. 27, 2006", 14 pgs.

"U.S. Appl. No. 10/252,129, Response filed Apr. 14, 2008 to Non-Final Office Action mailed Jan. 14, 2008", 14 pgs.

"U.S. Appl. No. 10/252,129, Response filed May 11, 2009 to Non Final Office Action mailed Feb. 10, 2009", 15 pgs.

"U.S. Appl. No. 10/252,129, Response filed Jul. 31, 2008 to Final Office Action mailed May 29, 2008", 13 pgs.

"U.S. Appl. No. 10/252,129, Response filed Oct. 5, 2006 to Non Final Office Action mailed Aug. 18, 2006", 15 pgs.

"U.S. Appl. No. 10/252,129, Response filed Nov. 11, 2008 to Final Office Action mailed Sep. 15, 2008", 14 pgs.

"U.S. Appl. No. 10/252,129, Response filed Nov. 26, 2007 to Final Office Action mailed Oct. 5, 2007", 15 pgs.

"Blackthorne Products Page", http://web.archive.org/web/19990508065201/ www.blackthornesw.com/Bthome/products, (1999).

"DHL and UPS offer country-specific services" *Transportation and distribution*, vol. 38, Iss. 12, (Dec. 1997), 18.

"Frequently Asked Questions about Mister Lister", http://pages.ebay.co.uk/help/sellerquide/mr-lister-faq.html, (Copyright 1995-2005).

"Google looking at more Country Specific Domains", *Europmedia*, (Jan. 17, 2002).

"Photodisc localizes Internet presence to better serve global markets;Adds country-specific content and languages to its Award-wining Websites", *Business Wire*, (May 27, 1998), 3 pgs.

Alice, Michele, "eBay's 'Mister Lister' Auction Management Software", *Auctionbytes-Update*, No. 22, (Sep. 24, 2000).

auctionwatch.com, et al., *AuctionWatch.com's Official Guide to Online Buying and Selling: Professional Tips, Tactics, and Techniques at Your Fingertips.*, Prima Publishing, Roseville, CA. ISBN 0-7615-2999-3, (2000), 307 pgs.

auctionwatch.com, et al., "AuctionWatch CD", *AuctionWatch.com's Official Guide to Online Buying and Selling: Professional Tips, Tactics and Techniques at Your Fingertips.*, Prima Publishing, Roseville, Ca., (2000).

Business Wire, "Bay Builder Releases Major Innovation for Online Wireless Auctions.", Recovered via Dialog Database on Feb. 15, 2008, (Mar. 10, 2000).

Collete, Stacy, "Thin Clients Pull in Car Customers: Auto Auction company eyes move to Web.(Industry Trend or Event)", *Computerworld* recovered via dialog database on Feb. 15, 2008, (Apr. 5, 1999), p. 41(1).

Hansell, Saul, "Meg Whitman eBay, Net Survivors", *New York Times*, (May 5, 2002).

Hutchinson, Art, "E- Commerce : Building a Model", *Art. Communications Week* recovered via Dialog Database on Feb. 15 ,2008., (Mar. 17, 1997), p. 57.

Tak, Y., et al., "The SIFT Information Dissemination System", *ACM Transactions on Database System*. vol. 24, Issue 4. ACM Press, (Dec. 1999), 529-565.

Wikipedia, "Thin Client",[Online] Retrieved from the Internet: <URL:http://en.wikipedia.org/wiki/Thin_client>, (Feb. 15, 2008), 13 pgs.

U.S. Appl. No. 09/602,110, Response filed Jul. 20, 2009 to Non Final Office Action mailed Mar. 18, 2009, 21 pgs.

U.S. Appl. No. 10/252,127, Advisory Action mailed May 1, 2008, 3 pgs.

U.S. Appl. No. 10/252,127, Non-Final Office Action mailed Jun. 26, 2009, 14 pgs.

U.S. Appl. No. 10/252,127, Response filed Jun. 12, 2008 to Final Office Action mailed Jan. 11, 2008, 16 pgs.

U.S. Appl. No. 10/252,127, Response filed Sep. 28, 2009 to Non Final Office Action mailed Jun. 26, 2009, 16 pgs.

U.S. Appl. No. 10/252,128, Response filed Aug. 3, 2009 to Final Office Action mailed Apr. 3, 2009, 4 pgs.

U.S. Appl. No. 10/252,129, Final Office Action mailed Jun. 18, 2009, 13 pgs.

U.S. Appl. No. 10/252,129, Response filed Oct. 19, 2009 to Advisory Action mailed Oct. 16, 2009, 17 pgs.

U.S. Appl. No. 10/252,129, Response filed Aug. 16, 2009 to Final Office Action mailed Jun. 18, 2009, 19 pgs.

U.S. Appl. No. 10/252,129, Response filed Sep. 18, 2009 to Advisory Action mailed Sep. 2, 2009, 19 pgs.

AuctionWatch.com, http://web.archive.org.web/20011217190108/wsacp.auctionwatch.com/login.html?ret=/my/acp/, 19 pgs.

(56) References Cited

OTHER PUBLICATIONS

U.S. Appl. No. 09/602,110, Final Office Action mailed Nov. 25, 2009, 17 pgs.
U.S. Appl. No. 09/602,110, Response filed Jan. 25, 2010 to Final Office Action mailed Nov. 25, 2009, 22 pgs.
U.S. Appl. No. 10/252,127, Appeal Brief filed Mar. 11, 2009, 27 pgs.
U.S. Appl. No. 10/252,127, Final Office Action mailed Jan. 7, 2010, 11 pgs.
U.S. Appl. No. 10/252,127, Response filed Mar. 8, 2010 to Final Office Action mailed Jan. 7, 2010, 17 pgs.
U.S. Appl. No. 10/252,128, Appeal Brief filed Dec. 15, 2009, 23 pgs.
U.S. Appl. No. 10/252,129, Advisory Action mailed Sep. 2, 2009, 2 pgs.
U.S. Appl. No. 10/252,129, Advisory Action mailed Oct. 6, 2009, 3 pgs.
U.S. Appl. No. 10/252,129, Examiner Interview Summary mailed Mar. 19, 2008, 2 pgs.
U.S. Appl. No. 10/252,129, Examiner Interview Summary mailed Mar. 31, 2009, 2 pgs.
U.S. Appl. No. 10/252,129, Examiner Interview Summary mailed Jul. 11, 2008, 2 pgs.
U.S. Appl. No. 10/252,129, Final Office Action mailed Apr. 23, 2010, 18 pgs.
U.S. Appl. No. 10/252,129, Non-Final Office Action mailed Nov. 12, 2009, 19 pgs.
U.S. Appl. No. 10/252,129, Response filed Feb. 12, 2010 to Non Final Office Action mailed Nov. 12, 2009, 20 pgs.
U.S. Appl. No. 11/508,420, Advisory Action mailed Oct. 29, 2009, 2 pgs.
U.S. Appl. No. 11/647,728, Non-Final Office Action mailed Mar. 8, 2010, 18 pgs.
"Auctionwatch", [Online]. Retrieved from the Internet: <URL: http://web.archive.org/web/20000830150100/http://www.auctionwatch.com>, (Aug. 15, 2008), 46 pgs.
"U.S. Appl. No. 10/252,127, Notice of Allowance mailed Mar. 18, 2011", 16 pgs.
"U.S. Appl. No. 10/252,128, Decision on Pre-Appeal Brief Request mailed Oct. 15, 2009", 2 pgs.
"U.S. Appl. No. 10/252,129, Appeal Brief filed Apr. 25, 2011", 32 pgs.
"U.S. Appl. No. 10/252,127, Interview Summary filed Apr. 15, 2011", 2 pgs.
"U.S. Appl. No. 10/252,129, Examiners Answer to Appeal Brief mailed May 13, 2011", 19 pgs.
"U.S. Appl. No. 13/080,426, Non Final Office Action mailed Oct. 31, 2011", 8 pgs.
"U.S. Appl. No. 13/080,426, Notice of Allowance mailed Jan. 26, 2012", 7 pgs.
"U.S. Appl. No. 13/080,426, Notice of Allowance mailed Apr. 23, 2012", 7 pgs.
"U.S. Appl. No. 13/080,426, Response filed Dec. 28, 2011 to Non Final Office Action mailed Oct. 31, 2011", 9 pgs.
"U.S. Appl. No. 13/285,916, Non Final Office Action mailed Jun. 4, 2012", 16 pgs.
"U.S. Appl. No. 09/602,110, Appeal Decision mailed May 29, 2013", 10 pgs.
"U.S. Appl. No. 09/602,110, Examiner's Answer to Appeal Brief mailed Mar. 7, 2007", 13 pgs.
"U.S. Appl. No. 10/252,127, Decision on Pre-Appeal Brief Request mailed Feb. 11, 2009", 2 pgs.
"U.S. Appl. No. 10/252,127, Decision on Pre-Appeal Brief Request mailed May 12, 2008", 2 pgs.
"U.S. Appl. No. 10/252,127, Decision on Pre-Appeal Brief Request mailed May 14, 2010", 2 pgs.
"U.S. Appl. No. 10/252,128, Notice of Allowance mailed May 30, 2013", 9 pgs.
"U.S. Appl. No. 13/285,916, Advisory Action mailed Jan. 30, 2013", 3 pgs.
"U.S. Appl. No. 13/285,916, Final Office Action mailed Nov. 21, 2012", 17 pgs.
"U.S. Appl. No. 13/285,916, Non Final Office Action mailed Jul. 15, 2013", 17 pgs.
"U.S. Appl. No. 13/285,916, Response filed Jan. 17, 2013 to Final Office Action mailed Nov. 21, 2012", 15 pgs.
"U.S. Appl. No. 13/489,646, 312 Amendment filed Mar. 7, 2013", 4 pgs.
"U.S. Appl. No. 13/489,646, Notice of Allowance mailed Jan. 10, 2013", 7 pgs.
"U.S. Appl. No. 13/489,646, PTO Response to 312 Amendment mailed Mar. 14, 2013", 2 pgs.
"U.S. Appl. No. 13/489,646, Response filed Dec. 3, 2012 to Non Final Office Action mailed Sep. 19, 2012", 11 pgs.
U.S. Appl. No. 13/285,916, filed Oct. 31, 2011, Customizing an Application.
"U.S. Appl. No. 13/285,916, Response filed Aug. 30, 2012 to Non Final Office Action mailed Jun. 4, 2012", 15 pgs.
"U.S. Appl. No. 13/489,646 Non Final Office Action mailed Sep. 19, 2012", 8 pgs.

\* cited by examiner

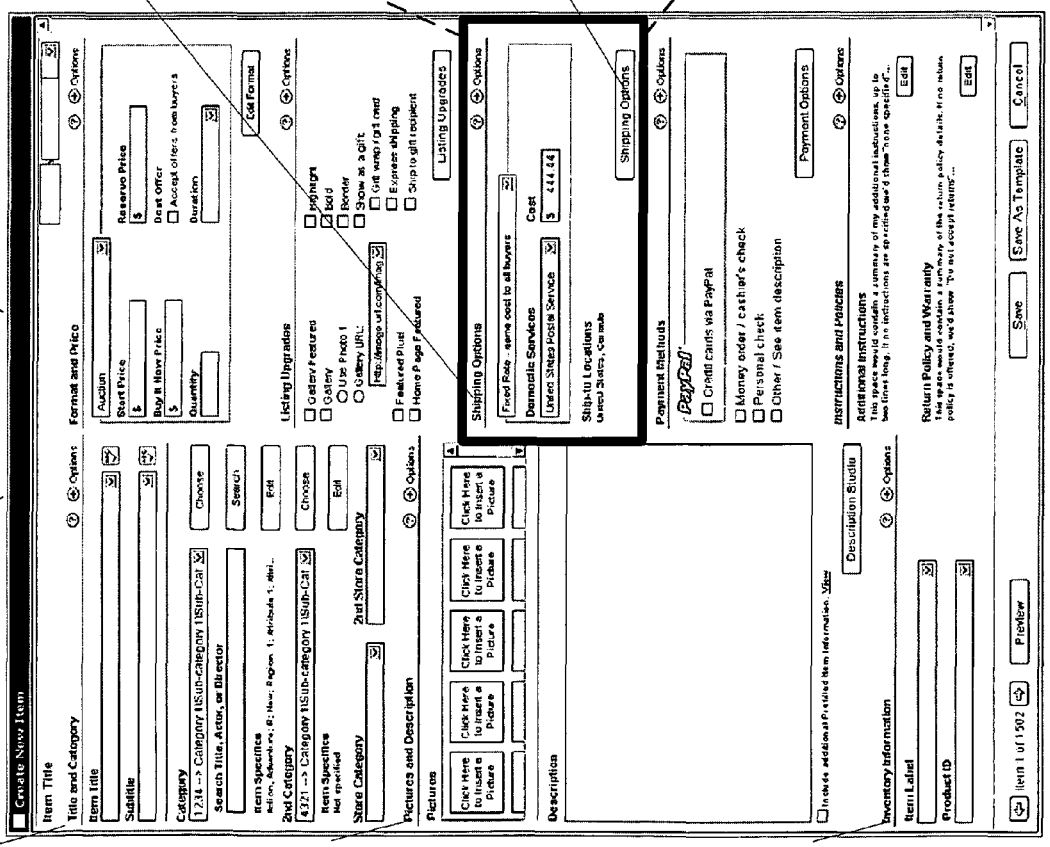
FIG. 2B
FIG. 2C

METHOD AND SYSTEM FOR SHARING METADATA BETWEEN INTERFACES

FIELD

This application relates to a method and system for sharing metadata between interfaces, and specifically sharing metadata between a client interface and a web interface.

BACKGROUND

Network applications are commonly distributed utilizing two different approaches, a client application and a web application. For example, a service or product provider (hereinafter, provider) operating over a network (e.g., the Internet) may utilize a client application running on a client device and a web server serving web pages to a client web application to exchange various types of data, such as transaction data or user configuration data.

In the first approach, a client application is created, or hard coded, in a programming language such as C++ and then offered to users as a download via a network, or distributed by another means such as compact disk (CD), etc. Once downloaded and/or installed, the user may interact with the client application in communication with the provider's server to exchange data. As with most computer applications for users, the client application is centered on a user interface that provides functionality and displays data generated and communicated by the provider as well as data generated by the user, which may be uploaded to the provider's server.

In order to provide a consistent user experience for the user of the client application and the user of a web application, the provider has to maintain and release new versions of each application whenever a change occurs. Consequently, a provider may incur significant costs in time and resources to ensure a new client application is generated each time a change is made to the web application and vice versa.

BRIEF DESCRIPTION OF DRAWINGS

The present embodiments are illustrated by way of example and not limitation in the figures of the accompanying drawings, in which like references indicate similar elements and in which:

FIG. 2B illustrates an example embodiment of a user interface (UI) screenshot that may be associated with a programmatic framework.

FIG. 2C illustrates an example embodiment of a user interface (UI) screenshot that may be associated with or activated from another UI within the programmatic framework.

DETAILED DESCRIPTION

In the following description, for purposes of explanation, numerous specific details are set forth in order to provide a thorough understanding of the various embodiments herein. It will be evident, however, to one skilled in the art that these and other embodiments may be practiced without these specific details.

In one embodiment, a networked system includes a web application and distributed client applications configured to give their respective users a similar user experience on each application type. To facilitate providing a similar user experience, a common framework (e.g., user interface and supporting logic) may be used in each application such that a single file containing configuration data (e.g., operational rules, framework data, UI data, etc.) may be communicated to each application and utilized by each framework to create a substantially similar user experience with respect to the user interface and its underlying functionality.

These example embodiments allow for a network system to leverage the advantages of the client application and the web application. For example, a client application has an advantage of being flexible, such that a user may interact with the client application offline. On the other hand, a web application dynamically provides user interface data to one or more web clients that can be accessed by any machine on a network (e.g., Internet) where the machine includes a web client application, such as a common web browser. The dynamic flow of data has a few advantages. For example, any change to the user interface may be implemented on the provider's web server, which seamlessly shows up the next time the user refreshes or enters the provider's link and downloads the new page data. Although this approach provides a lot of flexibility with respect to updating functionality, it does not allow for offline activities since the application's functionality is derived from data received dynamically from the provider's web server.

Figure 1:
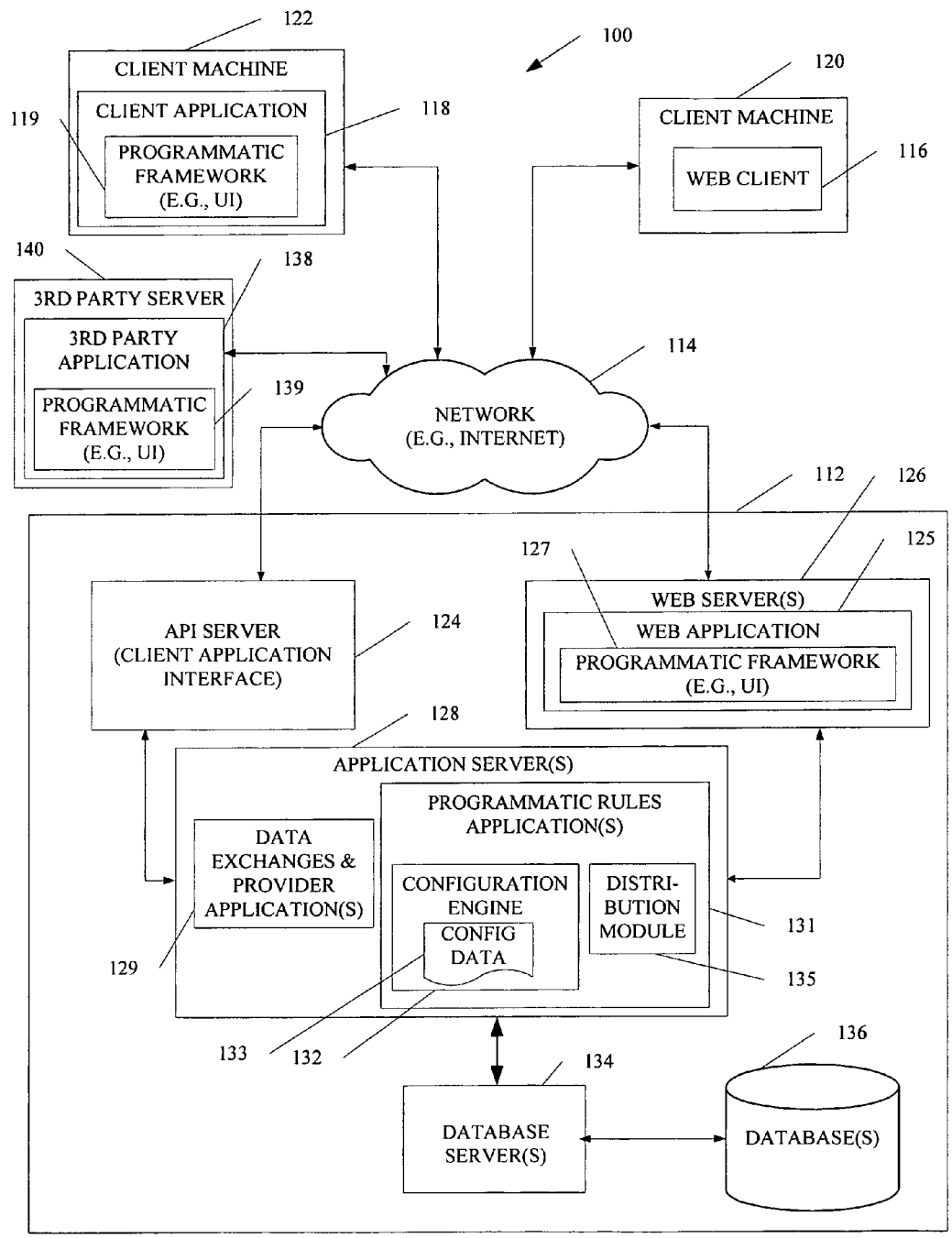
FIG. 1 is a network diagram of an example embodiment depicting a data exchange system having a client-server architecture configured for exchanging data over a network.

FIG. 1 is a network diagram depicting a data exchange system 100, according to one embodiment, having a client-server architecture configured for exchanging data over a network. For example, the data exchange system 100 may be a trading/commerce system where clients may communicate and exchange data with the trading/commerce system, the data may include product listings, auction bids, feedback, etc.

A data exchange platform, in an example form of a network-based provider 112, provides server-side functionality, via a network 114 (e.g., the Internet) to one or more clients. The one or more clients may include users that may utilize the data exchange system 100, and more specifically the network-based provider 112, to facilitate data exchanges, such as various types of transactions (e.g., purchases, listings, feedback, etc.). These data exchanges may be dependent upon user selected functions available through a client/user interface (UI) (e.g., see FIG. 2B). The UI may be associated with a client machine, such as a client machine 120 utilizing a web client 116 served from a web application 125 operating on a web server 126. The UI may also be associated with a client machine 122 utilizing a client application 118, or a third party server 140 hosting a third party application 138.

The web server 126, the client application 118, and the third party application 138 may each host a similar programmatic framework (e.g., programmatic frameworks 119, 127, 139) to provide a user of the client machine 122, third party server 140 or the client machine 120 a similar experience in functionality for a given transaction. For example, this functionality may include similarities of a particular look and feel of a user interface (UI) (e.g., what and how data is displayed on the UI, see FIG. 2B), application functionality based on validation rules and/or rolls for the user, programmatic logic to determine a sequence of actions or displays, and dependency rules to determine what is displayed based on user interaction. It can be appreciated that in other embodiments there may be a multitude of web servers 126 operating on one or more network-based providers 112, but for simplicity a single network-based providers 112 and a single web server 126 is discussed hereinafter.

In various embodiments, the third party server 140 may or may not include the third party application 138. The third party application 138 may be remote from the third party server 140 but still be in communication via the network 114. In one embodiment, the third party application 138 may only include a subset of functionality (e.g., look and feel of the UI, etc.) that may be associated with the client application 118 and the web application 125. This may provide a programmer or administrator of the third party application 138 with the flexibility to pick and choose (if not mandated by the network-based provider 112) for its programmatic framework 139 which functions it will have in common with the programmatic frameworks 119, 127 of the client application 118 and the web application 125, respectively.

Turning specifically to the network-based provider 112, an application program interface (API) server 124 and a web server 126 are coupled to one or more application servers 128. The application servers 128 host one or more data exchange and provider applications 129, and one or more programmatic rules application(s) 131. The application servers 128 are, in turn, shown to be coupled to one or more database server(s) 134 that facilitate access to one or more database(s) 136.

The programmatic rules application(s) 131 may include a configuration engine 132 that may process configuration data 133 and a distribution module 135 to distribute the configuration data 133 to the client application 118, the web application 125 of the web server 126, and the third party application 138. The configuration data 133 may include but is not limited to framework data, programmatic logic, and validation rules. Once received, the client application 118, the web application 125, and the third party application 138 may utilize the configuration data 133 within their respective programmatic frameworks 119, 127, 139. This may include implementing programmatic changes to existing, or addition of functionality, to the client applications 118, the third party application 138, and the programmatic components served from the web application 125 to the web client 116, without having to create a new client application 118, a new third party application 138 and a new web application 125. In this example embodiment, the client application 118, the third party application 138, and the web application 125 may be updated by a single file or electronic document, such as the configuration data 133. Although the configuration data 133 is discussed herein as being distributed via a network, in other embodiments the configuration data 133 may be distributed via other distribution media, such as compact disk, floppy disk, flash media, etc. A more detailed discussion of embodiments associated with the configuration data 133 is discussed below.

The network-based provider 112 may include functionality that periodically checks (e.g., via polling) the version of the configuration data 133 being implemented by the client application 118, the web application 125, and the third party application 138. In cases where a particular application is out of date, the network-based provider 112 may push the new configuration data to the out of date application. In another embodiment, the applications may request, automatically or by user interaction, a configuration data version status. If out of date, the applications may then request the updated version of the configuration data 133.

The web client 116 may access the various data exchange and provider applications 129 and programmatic rules application(s) 131 via the web interface supported by the web server 126. Similarly, the client application 118 may access the various services and functions provided by the data exchange and provider applications 129 and the programmatic rules application(s) 131 via the programmatic interface provided by the API server 124. The client application 118 may, for example, be a seller application (e.g., the TurboLister® application developed by eBay Inc., of San Jose, Calif.) to enable sellers to author and manage listings at the network-based provider 112 in an off-line manner, and to perform batch-mode communications between the client application 118 and the network-based provider 112.

As mentioned above, FIG. 1 also illustrates the third party application 138, executing on the third party server machine 140, as having programmatic access to the network-based provider 112 via the programmatic interface provided by the API server 124. For example, the third party application 138 may utilize information retrieved from the network-based provider 112 to support one or more features or functions on a website hosted by the third party. The third party website may, for example, provide one or more promotional, marketplace or payment functions that are supported by the relevant applications of the network-based provider 112.

For simplicity, the discussion hereafter will focus on client application 118 and the web application 125. It can be appreciated the third party application 138 may have substantially similar functionality and application to that of the client application 118 with respect to the various embodiments described herein.

Figure 2A:
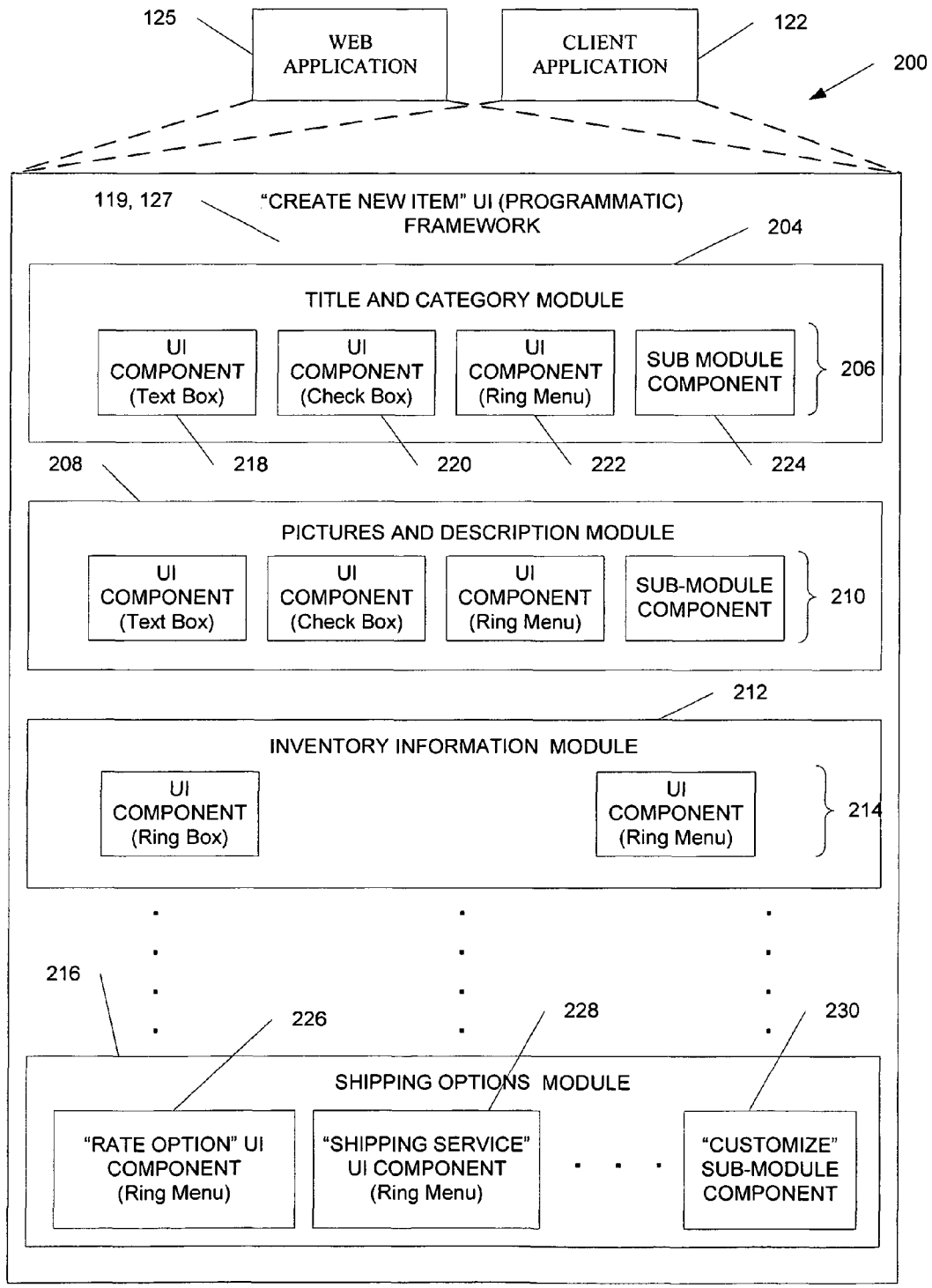
FIG. 2A illustrates modules in example embodiment of programmatic frameworks associated with a client application and a web application.

FIG. 2A illustrates modules, according to an example embodiment, of the programmatic frameworks 119, 127 associated with the client application 122 and the web application 125, respectively. The programmatic frameworks 119, 127 (e.g., a UI framework) may include various types of framework data, which includes but is not limited to modules, such as a title and category module 204, a pictures and description module 208, an inventory information module 212, and a shipping options module 216. These modules are for example purposes only, and it can be appreciated that, in various embodiments, the number and type of modules included in a programmatic framework (e.g., programmatic frameworks 119, 127) may be dependent upon the functions associated with an application of the network-based provider 112. In various embodiments, when these modules are utilized within their respective frameworks, they may create and provide various programmatic responses. These programmatic responses may include input/output functions and displays associated with a user interface, such as a graphical user interface associated with the client machines 120, 122.

The title and category module 204, the pictures and description module 208, and the inventory information module 212, according to one embodiment, includes various component sets such as component sets 206, 210, 214, respectively. For example, the component set 206 of the title and category module 204 include a UI component 218 in the form of a text box, a UI component 220 in the form of a check box, a UI component 222 in the form of a ring menu, and a sub-module component 224. For simplicity, the component set 210 and the component set 214 include similar components as component set 206. However, it can be appreciated that in various embodiments, the pictures and description module 208 and the inventory information module 212 may have less, additional, or different components within their respective component sets (e.g., component sets 210, 214).

The shipping options module 216 includes specific components that will be discussed further with reference to FIG. 2B. Specifically, these components are a rate option UI component 226, a shipping service UI component 228, and a customize sub-module component 230.

In one embodiment, a multitude of category modules and their respective UI components are included in the programmatic frameworks 119, 127 upon distribution of their respective applications, the client application 118 and the web application 125. The rules (e.g., configuration data 133) received and processed by the client application 118 and the web application 125 may determine which, if not all, of the multitude of category modules are activated and more specifically which, if not all, of the components of the component sets are used and how they are displayed and executed on the client machines (e.g., client machine 120, 122). This is how, for example, a single set of rules (e.g., configuration data 133) may be communicated to two independent applications (e.g., the client application 118 and the web application 125) such that each application maintains substantially similar functionality with respect to each other.

Additionally, in other embodiments, new components may be inserted into one or more existing modules of each framework. For example, the configuration data 133 may provide instruction to copy or duplicate an existing UI component from an existing module and inserted into the existing or another module. The configuration data 133 may then further define the new UI component's attributes and functionality as described herein for updating existing modules and components. In another embodiment, a new UI component may be received at the client application 118 and web application 125 for addition to the programmatic frameworks 119, 127 via the configuration data 133. In yet another embodiment, a UI component may be a generic UI component stored by the client application on the host machine and included and defined in the programmatic framework as determined by the configuration data 133.

FIG. 2B illustrates a UI screenshot 231 that may be associated with the programmatic frameworks 119, 127, according to an example embodiment. The UI screenshot 231 may include a title and category section 232 that may be associated with the title and category module 204 and its component set 206. Similarly, the UI screenshot 231 may include a pictures and description interface 234, and an inventory information interface 236, which may be associated with the pictures and description module 208 and the inventory information module 212.

Although shown here as identical, the UI screenshot 231 may have different look and feel between the two programmatic frameworks 119, 127 but still include substantially similar modules and components sets such that a single set of rules (e.g., configuration data 133) may be used to make programmatic changes in each application. For example, the title and category section 232 in the programmatic framework 119 and the programmatic framework 127 may include the UI component 222, which is a ring menu, and a UI component configured as a selectable text box (not shown), each configurable to perform similar functions but using a different interface. Although each of the components are common to each programmatic frameworks 119, 127, the set of rules (e.g., the configuration data 133) may be used to activate the ring menu UI component for the programmatic framework 119 and the selectable textbox UI component for the programmatic framework 127.

In one embodiment the UI screenshot 231 includes a shipping options interface 238. The shipping options interface 238 may be associated with the shipping options module 216 of FIG. 2A. The shipping options interface 238 includes a shipping options button 240. In one embodiment, the shipping options button 240 may activate or cause to display a shipping options interface 242 as illustrated in FIG. 2C. The shipping options interface 242 corresponds with the shipping options module 216 and its associated components. For example, a select a shipping service ring menu 244 corresponds to the shipping service UI component 228 of the shipping options module 216. Similarly, a fixed rate ring menu 246 may be associated with the rate option UI component 226 of the shipping options module 216. Additionally, a customize button 248 may be associated with the customize sub-module component 230 of the shipping options module 216. In one embodiment, the customize sub-module component 230 when activated by the customize button 248 generates a new interface which may include additional components, such as UI components for ring menus, check boxes, text boxes etc.

Figure 3:
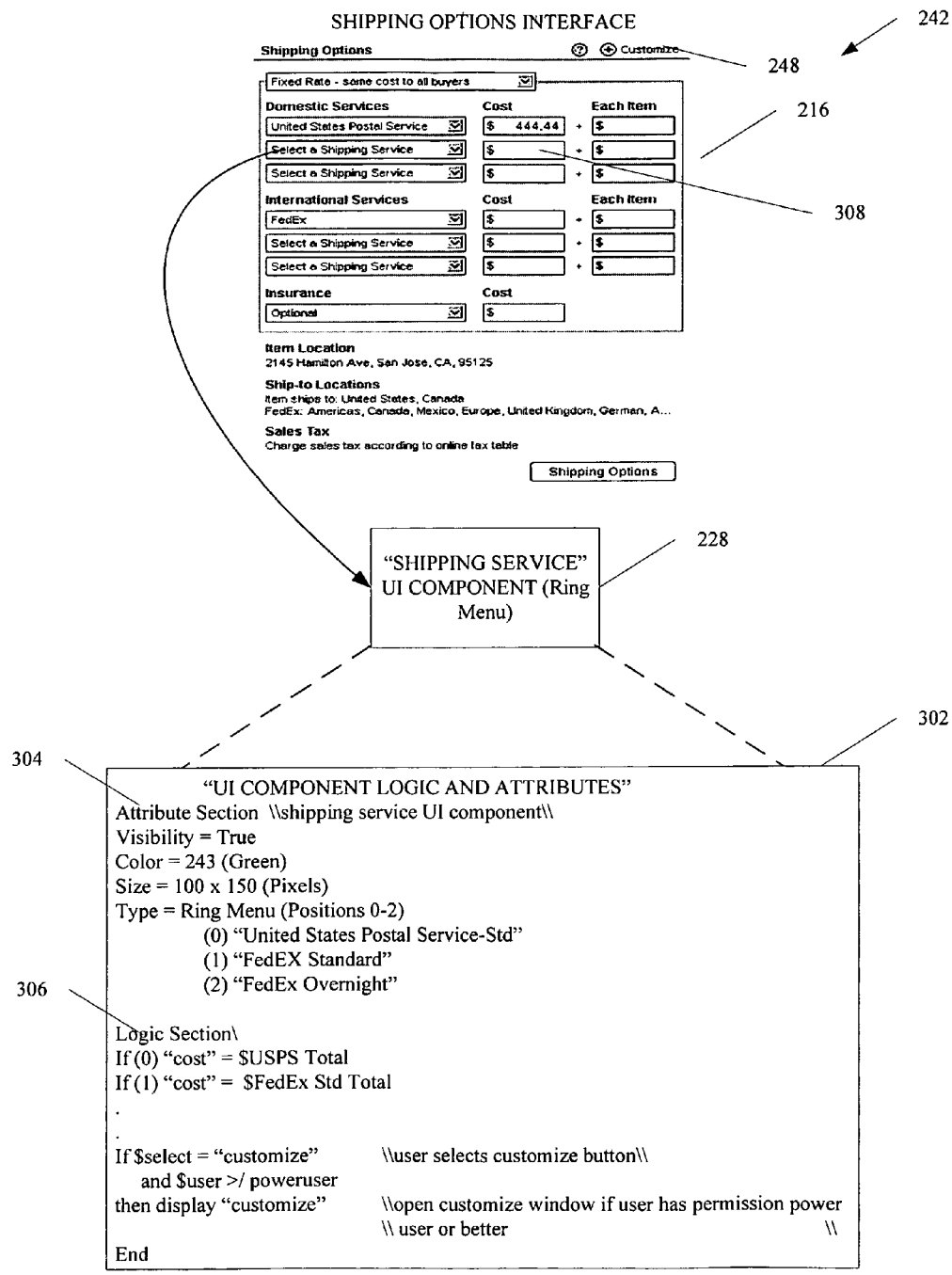
FIG. 3 illustrates an example embodiment of an options interface and its relationship to a UI component.

FIG. 3 illustrates an example embodiment of the shipping options interface 242 and its relationship to the shipping service UI component 228. The shipping service UI component 228 includes underlying programmatic logic and attributes, such as UI component logic and attributes 302. For example, the UI component logic and attributes 302 may include operational parameters that when executed within the shipping service UI component 228, cause a shipping options interface 242 to display a particular control that may be interacted with by a user. In this example, the control may be the select the shipping service ring menu 244 and may have attributes such as visibility, color, size, and type (e.g., ring menu). As illustrated in the UI component and logic attributes 302, the type is a ring menu including three positions each corresponding to a selectable shipping service (e.g., FedEx® overnight).

Additionally, the UI component logic and attributes 302 may include a logic section 306. The logic section 306 may include programmatic logic or rules for how the programmatic frameworks 119, 127 performs with respect to what a user may see and do on the client application 122 and the web client 116. For example, as shown in logic section 306, if the ring menu position of the select a shipping service ring menu 244 has a position value of zero, then a cost field 308 of the shipping options interface 242 may be updated with the United States Postal Service total representing the cost to ship a particular item.

In various other embodiments, the logic section 306 may include logic such that when a particular UI component is activated (e.g., ring menu position 1 selected) another module or sub-module within the programmatic frameworks 119, 127 is activated resulting in an underlying action and/or the display of a new user interface or additional user interface components within an existing interface, such as shipping options interface 242. In another example, the customize button of shipping options interface 242 may be selected by a user.

Codified logic within the logic section 306 may determine whether or not a new customize window opens based on the selection of the customize button 248 and the user's (e.g., of client machine 122) access privileges based on a login and access criteria. It can be appreciated that in various embodiments many types of attributes and logic may be applied to the UI component logic and attributes 302, and what is illustrated here with respect to FIG. 3 and its accompanying description is by example only.

Figure 4:
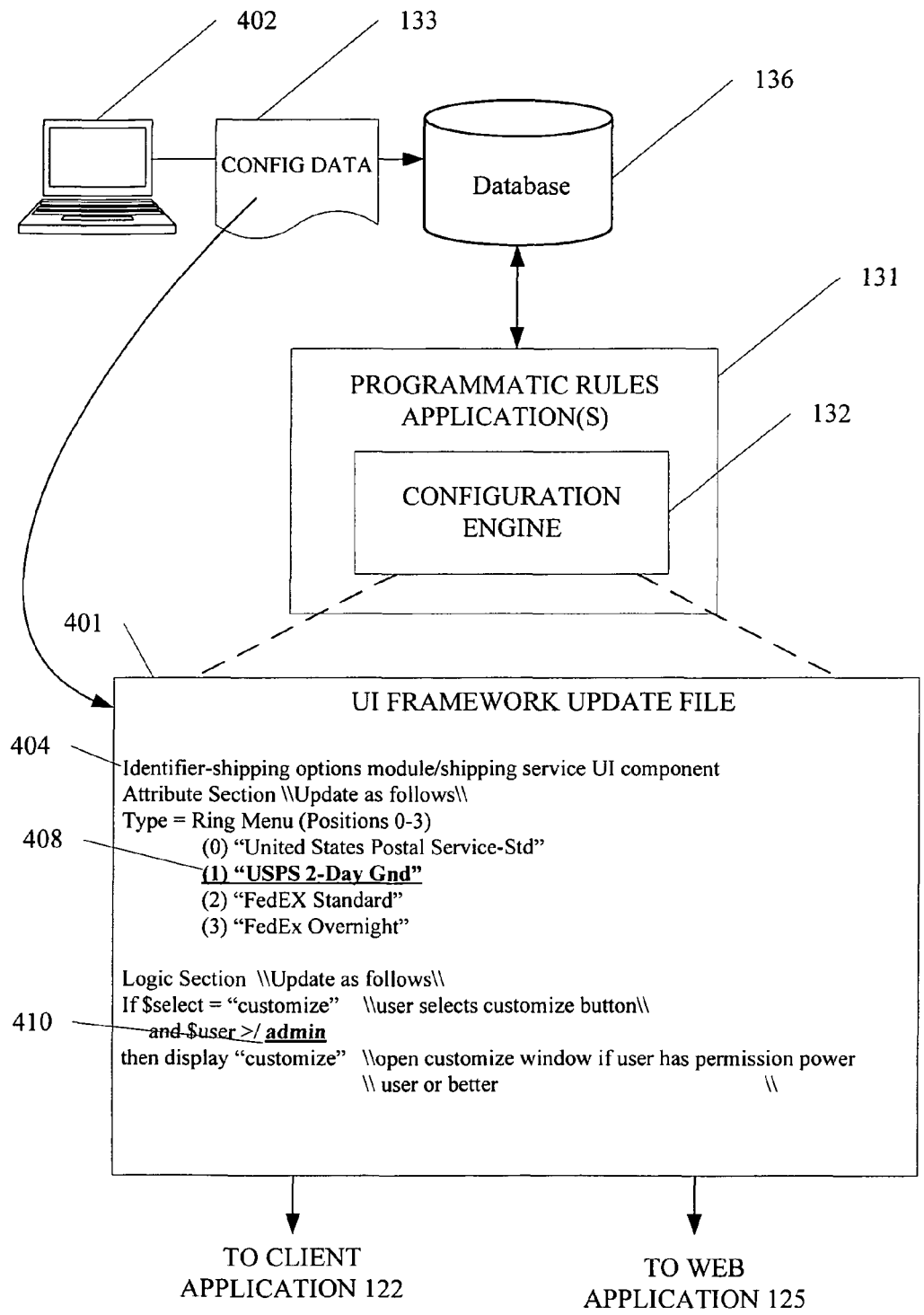
FIG. 4 illustrates an example embodiment of configuration data that may be distributed to a web application and a client application to update their respective UI frameworks.

FIG. 4 illustrates an example embodiment of the configuration data 133 that may be distributed to the web application 125 and the client application 118 to update their respective UI frameworks 127, 119. A user of computer system 402 may generate the configuration data 133 according to a programmatic language utilized by the programmatic framework 127, 119 of the web application 125 and the client application 118. For example, the programmatic framework 127, 119 may be implemented in an eXtensible Markup Language (XML) and the configuration data 133 may be metadata configured and recognizable by the components (e.g., shipping service UI component 228) of the modules (e.g., shipping options module 216) of the programmatic frameworks 119, 127. It can be appreciated in various embodiments, that the programmatic frameworks 119, 127 may be created using one of a multitude of programmatic languages such that the configuration data 133 may be utilized to update the functionality of the programmatic frameworks 119, 127 of the client application 122 and the web application 125, respectively.

A user of computer system 402, according to one embodiment, may create the configuration data 133 for distribution to the web application 125 and the client application 118. In one embodiment, the configuration data 133 is stored in the database(s) 136, which then may be accessed by the programmatic rules application(s) 131 via the database server(s) 134. In another embodiment, the computer system 402 is integrated into the network-based provider 112 and may be in direct communication with the programmatic rules application(s) 131. The programmatic rules application(s) 131 may provide the programmatic interface to the computer system 402 for generating the configuration data 133.

In one embodiment, the configuration engine 132 of the programmatic rules application(s) 131 may format the configuration data 133, as generated by computer system 402 and/or retrieve from database(s) 136, into a format usable by the client application 118 and the web application 125 and their respective programmatic frameworks 119 and 127. The configuration data 133 does not require additional formatting and the configuration engine 132 and the programmatic rules application(s) 131 are utilized to distribute the configuration data 133 to the web application 125 and the client application 118. In one embodiment, the configuration data 133 may be distributed as a text file over the network 114 to the client application 118 on the client machine 122 or within an internal network within the network-based provider 112 within communication with the web application 125 within the web server 126. In other embodiments, the configuration data 133 is distributed or communicated to the web application 125 and the client application 118 in one of many types of files known in the art, such as an encrypted file, a binary file, a text file, etc.

A UI framework update file 401 illustrates an example embodiment of the configuration data 133 composed to update a UI component such as the UI component logic and attributes 302 portion of the shipping service UI component 228. In this example, the UI framework update file 401 includes an identifier 404. The identifier 404 may be any string or alphanumeric character or other unique identifier indicating which UI component of which module to update in the programmatic frameworks 119, 127. The purpose of identifier 404 is to ensure the appropriate UI component in the appropriate module is correctly updated. As illustrated here, identifier 404 identifies the shipping options module 216 and the shipping service UI component 228.

The UI framework update file 401 may include updates to the various portions of the UI components, such as updates to the UI component logic and attributes 302 of the shipping service UI component 228. For example, an update 408 illustrates an addition to the ring menu of shipping service UI component 228, and more specifically adds an additional shipping service that may be selected from the ring menu. An update 410 illustrates a change to the logic section 306 of the UI component logic and attributes 302. Specifically, the update 410 changes the permissions required for the customization window to be activated. Because the programmatic framework 119 of the client application 118 and the programmatic framework 127 of the web application 125 are substantially similar and share substantially the same modules the same UI framework update file 401 may be used to update each programmatic framework 119 and 127.

In another embodiment (not shown), and update may include the addition of a new UI component to the programmatic frameworks 119, 127. For example, the UI framework update file 401 may include instructions to add a new UI component from the existing repository associated with the programmatic framework, and attribute values to define the UI component attributes (e.g., UI position of new module, ring menu titles, etc.). The updates and the corresponding file text are only examples of updates to the attributes and logic section of a UI component within a UI (programmatic) framework, and that many variations in programmatic logic and attributes may exist which may be updated according to the methods describes herein.

Figure 5:
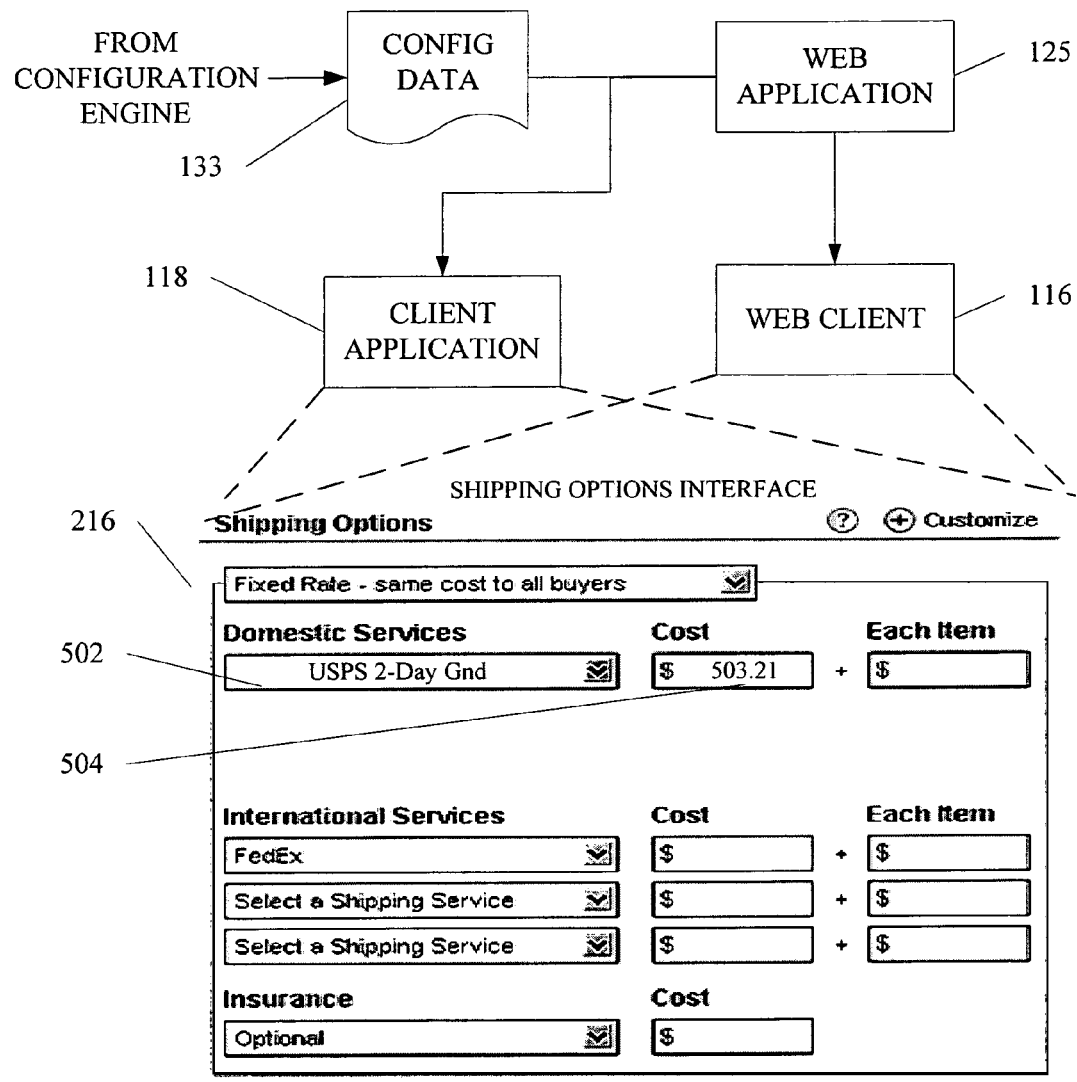
FIG. 5 illustrates an example embodiment of configuration data propagating from a configuration engine to a framework, and specifically a user interface.

FIG. 5 illustrates an example embodiment of the propagation of the configuration data 133, and specifically the communication of the example UI framework update file 401 to the web client 116 and the client application 122. In this example, the UI framework update file 401 is for updating the shipping options interface 242. In various embodiments, all or a portion of the UI framework update file 401 may be shared between the client application 118 and web application 125. In such a manner, particular instructions or data may be targeted to either or both of the web client 116 and the client application 122.

The ring menu 502 of the shipping options interface 242 illustrates the addition of the USPS to the ground option as discussed with reference to the update 408 in FIG. 4. Additionally, the cost field 504 may also be updated to reflect the new ring menu selection. Although not shown, the shipping service UI component 228 may include the necessary programmatic functions to calculate the cost field 504 and may also have to be updated accordingly. In other embodiments, the cost field 504 and its contents are a local or global variable(s) within the programmatic frameworks 119, 127, thus they may be available to other portions of the programmatic frameworks 119, 127 (e.g., a calculations module). These other portions may be in communication with elements and components external to the host client machine 120, 122 to acquire data that may be necessary for calculations, inquiries (user or system), etc. (e.g., obtaining the latest shipping rates from a shipper's web site).

Figure 6A:
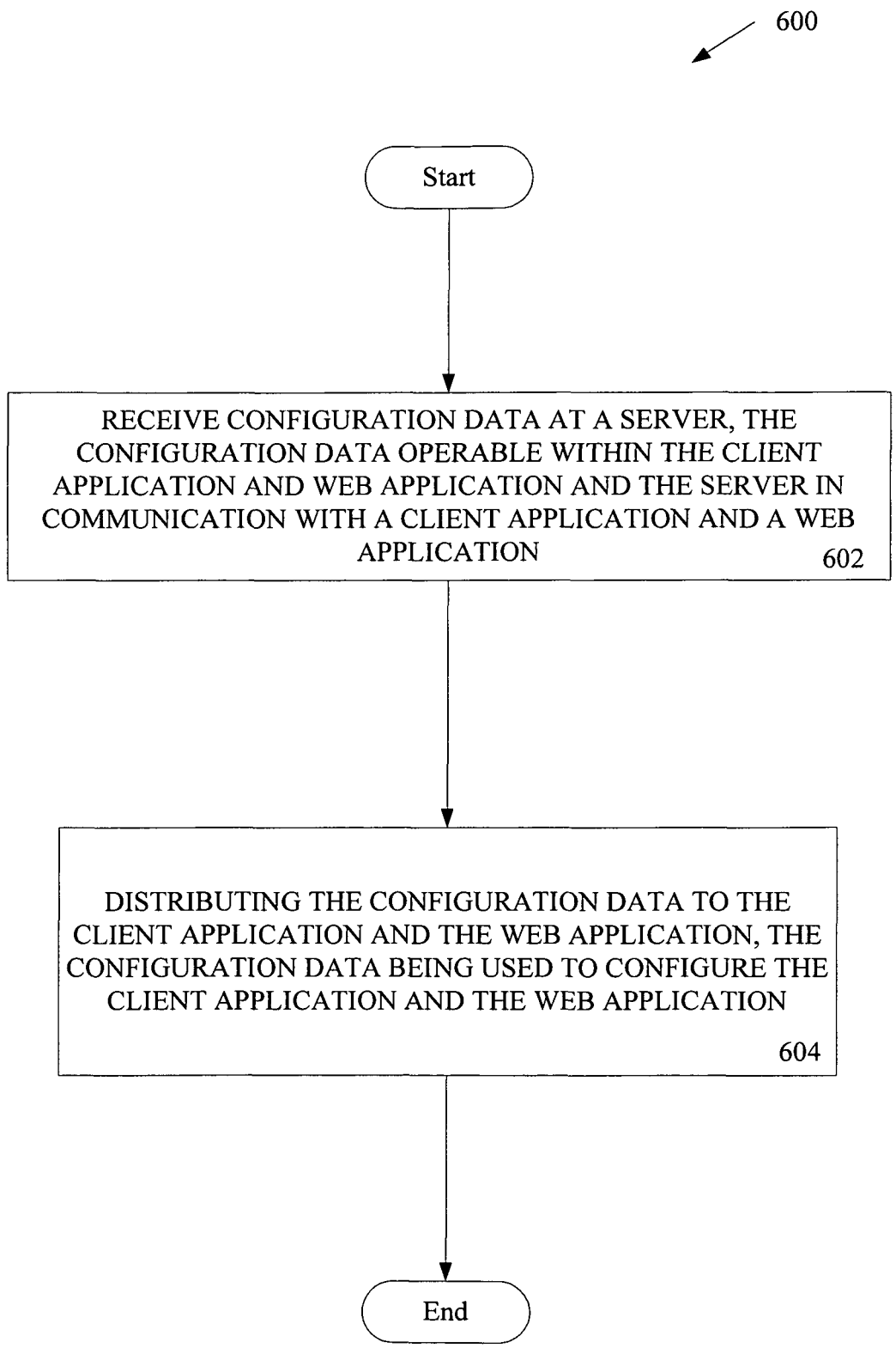
FIG. 6A is a flow chart, according to an example embodiment, illustrating the operations of distributing configuration data to a client application and a web application

FIG. 6A is a flow chart 600, according to an example embodiment, illustrating the operations of distributing the configuration data 133 universal to the client application 118 and the web application 125. At operation 602, the server (e.g., application servers 128) receives the configuration data operable within the client application 118 and web application 125. In one embodiment, the server is communicatively coupled to the client application 118 and the web application 125 via the network 114 (e.g., Internet, intranet, etc.). In another embodiment to distribute the configuration data 133, the client machine 122 hosting the client application 118 (or other networked device, see description with reference to FIG. 7) may also include applications (e.g., the programmatic rules application(s) 131), which may operate in the capacity of a peer machine in a peer-to-peer (or distributed) network environment, to provide a source for the distribution of the configuration data 133.

At operation 604, the server distributes the configuration data 133 to the client application 118 and the web application 125. The configuration data 133 may then be used to configure the client application 118 and the web application 125. In one embodiment, the server retrieves the configuration data 133 from a database (e.g., database(s) 136 via database server (s) 134). In another embodiment, the configuration data 133 is generated by a user via a programmatic interface and distributed to the client application 118 and the web application 125 prior to being stored in the database.

Figure 6B:
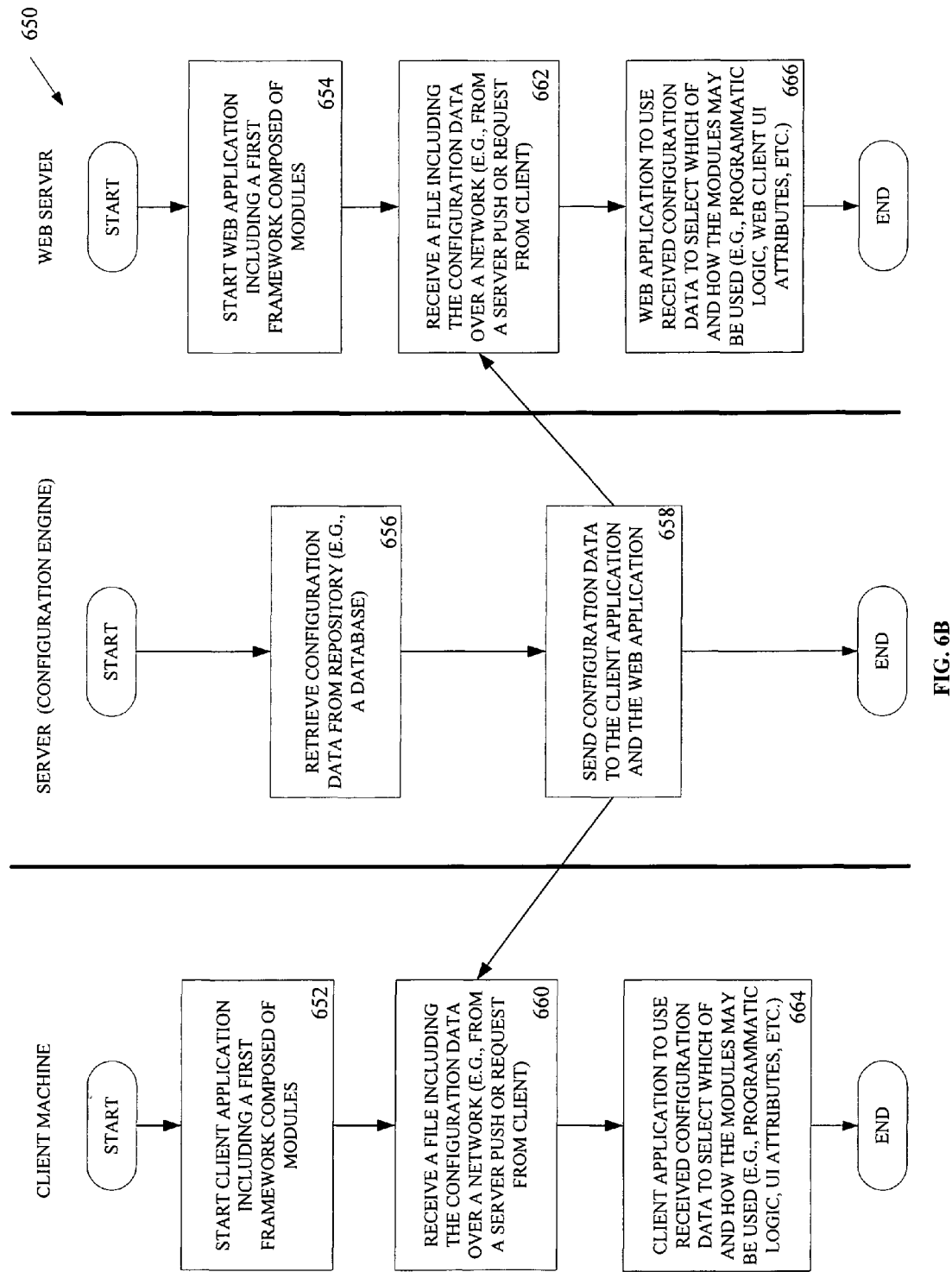
FIG. 6B is a flow chart, according to an example embodiment, illustrating the distribution and use of the configuration data by a client application and a web application.

FIG. 6B is a flow chart 650, according to an example embodiment, illustrating the distribution and use of the configuration data 133 by the client application 118 and the web application 125. At operations 652 and 654, the client application 118 and the web application 125 are started and require updated configuration data. The client application 118 and the web application 125 may include a first framework and a second framework, respectively. Each framework is further composed of modules and components which may be executed, in an example embodiment, according to the rules and logic provided by the updatable configuration data (e.g., configuration data 133).

Based upon a request to the server for updated configuration data or a command to push the configuration data to the applications, at operation 656, the server retrieves the configuration data 133 from a repository, such as database(s) 136. At operation 658, the server sends (e.g., via the network 114) the configuration data 133 to the client application 118 and the web application 125. As discussed above, other embodiments may also include communicating the configuration data 133 to the third party application 138.

At operations 660 and 662, the client application 118 and the web application 125 receive the configuration data 133. In one embodiment, the configuration data 133 is received over the network 114 as a file recognizable by each application as a configuration data file. The client application 118 and the web application 125 may then use the received configuration data 133 to select which of and how the modules may be used to generate the desired user interface, including the functionality behind the user interface operations. As discussed above, this is done in part through implementing programmatic logic, setting of UI attributes, etc., via the configuration data 133 and the respective frameworks of each application.

Figure 7:
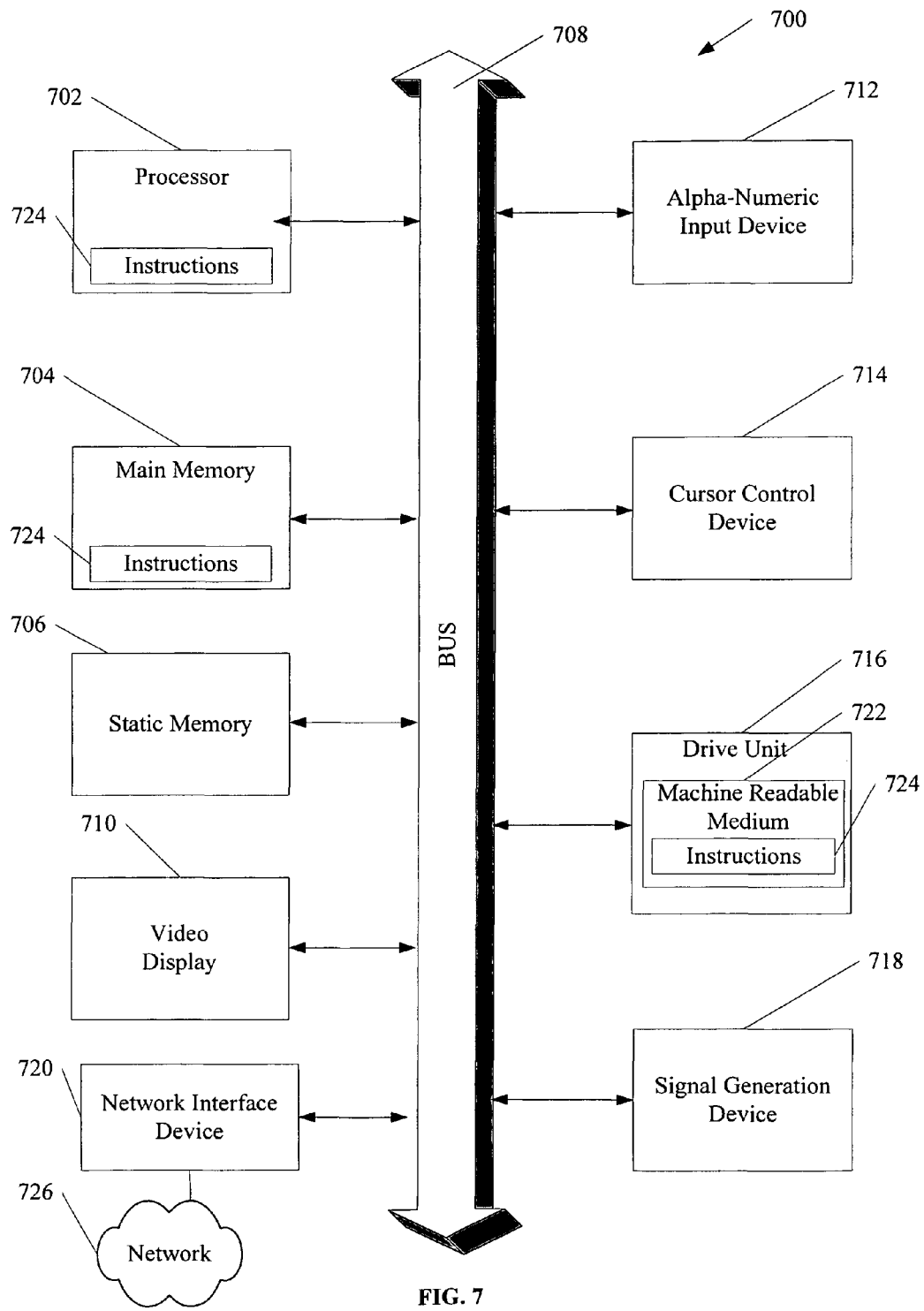
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term machine shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term machine-readable medium should be taken to include a single medium or multiple media (e.g., a centralized or distributed database, and/or associated caches and servers) that store the one or more sets of instructions. The term machine-readable medium shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term machine-readable medium shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to distribute configuration data over a network, the method including:
    receiving, at a server, configuration data operable within
        a client application installed on a client machine, to execute thereon, and
        a web application installed on one or more web servers to serve web pages to a web client over the network,
    the client application and the web application providing common functionality to respective users of the client machine and the web client; and using a distribution module, distributing the configuration data to the client application and the web application to configure the client application and the web application by configuring components of modules which are common to the client application and the web application, the configuration data to configure a particular component of the common modules to provide a particular programmatic response for the client application, and to configure another component of the common modules to provide the particular programmatic response for the web application.

2. The method of claim 1, wherein the configuration data includes at least one from a group including framework data, programmatic logic, validation rules, and user interface data.

3. The method of claim 2, wherein the client application includes a first framework and the web application includes a second framework, the first framework and the second framework including one or more common modules associated with a first programmatic response and a second programmatic response, respectively, the first programmatic response and the second programmatic response providing common functionality to respective users.

4. The method of claim 3, wherein the components of the one or more modules include at least one from a group including user interface components, functional components and sub-modules.

5. The method of claim 4, wherein the configuration data distributed to the client application and the web application includes at least one from a group including first framework data, second framework data, programmatic logic, validation rules, and user interface data.

6. The method of claim 5, wherein the first framework corresponds to the second framework, providing a common framework for the web application and the client application, the modules of the first framework corresponding to the modules of the second framework.

7. The method of claim 6, including using the configuration data distributed to the first framework and the second framework to select which modules of the one or more modules to use to generate the first programmatic response and the second programmatic response in die client application and the web client in communication with the web application, respectively.

8. The method of claim 7, wherein the using of the configuration data includes using the programmatic logic to select which components of the selected modules to use to generate the first programmatic response and the second programmatic response.

9. The method of claim 8, wherein the using of the programmatic logic to select which components of the selected modules to use includes using user input to select which components of the selected modules to use to generate the first programmatic response and the second programmatic response.

10. The method of claim 5, including using the validation rules of the configuration data to determine if a user of the client application or the web client is authorized to use at least one from a group including the client application, web client, modules of the first framework and the second framework, and components of the one or more modules of the first framework and the second framework.

11. The method of claim 10, wherein the client application is a third party application configured to generate the first programmatic response based on the configuration data and based on the determination.

12. The method of claim 1, including determining if the client application and the server have previously received the configuration data and selectively providing the configuration data to at least one of the client application and the web application.

13. A system to distribute configuration data over a network, the system including:
a configuration engine to receive configuration data operable within
a client application installed on a client machine, to execute thereon, and
a web application installed on one or more web servers to serve web pages to a web client over the network,
the client application and the web application providing common functionality to respective users of the client machine and the web client; and
a distribution module to distribute the configuration data to the client application and the web application to configure the client application and the web application by configuring components of modules which are common to the client application and the web application, the configuration data to configure a particular component of the common modules to provide a particular programmatic response for the client application, and to configure another component of the common modules to provide the particular programmatic response for the web application.

14. The system of claim 13, wherein the configuration data includes at least one from a group including framework data, programmatic logic, validation rules, and user interface data.

15. The system of claim 14, wherein,
the client application includes a first framework including one or more modules operable to create a first programmatic response based on using the configuration data received at the client application; and
the web application includes a second framework that corresponds to the first framework including one or more modules operable to create a second programmatic response based on using the configuration data received at the web application, the first programmatic response and the second programmatic response providing common functionality to respective users.

16. The system of claim 15, further including the first framework and the second framework to use the configuration data to select which modules of the one or more modules of the first framework and the second framework to use to generate the first programmatic response and the second programmatic response.

17. The system of claim 16, wherein the modules selected from the one or more modules of the first framework and the second framework to use the programmatic logic from the configuration data to select which components of the selected modules to use to generate the first programmatic response and the second programmatic response, the selected components for the first programmatic response being different from the selected components for the second programmatic response.

18. The system of claim 14, where in the first framework and the second framework to use the validation rules of the configuration data to determine if a user of the client application or the web client, respectively, is authorized to use at least one from a group including the client application, web client, one or more modules of the first framework and the second framework, and components of the one or more modules of the first framework and the second framework.

19. The system of claim 13, wherein the distribution module further to determine if the client application and the one or more web servers associated with the web application have previously received the configuration data and selectively to provide the configuration data to at least one of the client application and the web application.

20. A non-transitory machine-readable medium comprising instructions, which when executed by a machine, cause the machine to:
receive configuration data at a server operable within
a client application installed on a client machine, to execute thereon, and
a web application installed on one or more web servers to serve web pages to a web client over the network,
the client application and the web application providing common functionality to respective users of the client machine and the web client; and
distribute the configuration data to the client application and the web application to configure the client application and the web application by configuring components of modules which are common to the client application and the web application, the configuration data to configure a particular component of the common modules to provide a particular programmatic response for the client application, and to configure another component of the common modules to provide the particular programmatic response for the web application.

* * * * *

UNITED STATES PATENT AND TRADEMARK OFFICE
CERTIFICATE OF CORRECTION

PATENT NO. : 8,639,782 B2
APPLICATION NO. : 11/508420
DATED : January 28, 2014
INVENTOR(S) : Liu et al.

It is certified that error appears in the above-identified patent and that said Letters Patent is hereby corrected as shown below:

In the Claims:

In column 10, line 60, in Claim 1, delete "within" and insert --within,--, therefor In column 11, line 41, in Claim 7, delete "die" and insert --the--, therefor In column 12, line 7, in Claim 13, delete "within" and insert --within,--, therefor In column 13, line 6, in Claim 20, delete "within" and insert --within,--, therefor Signed and Sealed this
Twelfth Day of August, 2014

Michelle K. Lee
*Deputy Director of the United States Patent and Trademark Office*